(12) United States Patent
Tomizawa

(10) Patent No.: US 11,558,586 B2
(45) Date of Patent: Jan. 17, 2023

(54) RECORDING SYSTEM AND RECORDING METHOD

(71) Applicant: JVCKENWOOD Corporation, Yokohama (JP)

(72) Inventor: Katsumi Tomizawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/468,728

(22) Filed: Sep. 8, 2021

(65) Prior Publication Data

US 2021/0409657 A1 Dec. 30, 2021

Related U.S. Application Data

(63) Continuation of application No. PCT/JP2020/009658, filed on Mar. 6, 2020.

(30) Foreign Application Priority Data

Mar. 25, 2019 (JP) ............................. JP2019-057485

(51) Int. Cl.
*H04N 7/18* (2006.01)
*G06T 7/90* (2017.01)
(Continued)

(52) U.S. Cl.
CPC ............... *H04N 7/188* (2013.01); *G06T 7/90* (2017.01); *G06V 20/41* (2022.01); *G06V 20/56* (2022.01);
(Continued)

(58) Field of Classification Search
None
See application file for complete search history.

(56) References Cited

U.S. PATENT DOCUMENTS

| 2016/0350298 | A1 | 12/2016 | Ono | |
| 2020/0158750 | A1* | 5/2020 | Zhou | G01S 17/931 |
| 2020/0252577 | A1* | 8/2020 | Teruuchi | G11B 27/031 |

FOREIGN PATENT DOCUMENTS

| JP | 2000-163687 | 6/2000 |
| JP | 2008-155862 | 7/2008 |

(Continued)

OTHER PUBLICATIONS

International Search Report and Written Opinion for International Application No. PCT/JP2020/009658 dated May 26, 2020, 9 pages.

*Primary Examiner* — Hung Q Dang
(74) *Attorney, Agent, or Firm* — Amin, Turocy & Watson, LLP

(57) ABSTRACT

A recording system includes a recording data acquisition unit, an analysis unit, a learning unit, and a determination unit. The recording data acquisition unit acquires recording data in which a surrounding situation of a vehicle is recorded. The analysis unit performs image analysis processing on video data included in the recording data to create information regarding a transition of a color component in the video data. The learning unit learns the transition of the color component using artificial intelligence to create a trained model used to determine an occurrence of an event. The determination unit determines whether an event occurs using the trained model on a basis of the recording data. When the determination unit determines the occurrence of the event, the event recording control unit causes a recording unit to record, as event recording data, the recording data including a time point upon the occurrence of the event.

5 Claims, 11 Drawing Sheets

(51) Int. Cl.
  *G06V 20/40* (2022.01)
  *G06V 20/56* (2022.01)
  *H04N 5/77* (2006.01)
  *G06K 9/00* (2022.01)
  *G06V 10/56* (2022.01)
  *G06V 20/58* (2022.01)
  *G07C 5/00* (2006.01)
  *G08G 1/00* (2006.01)
  *G08G 1/13* (2006.01)
  *H04N 5/91* (2006.01)

(52) U.S. Cl.
  CPC ..... *H04N 5/77* (2013.01); *G06T 2207/10016* (2013.01); *G06T 2207/10024* (2013.01); *G06T 2207/20081* (2013.01); *G06T 2207/30252* (2013.01); *G06V 20/44* (2022.01)

(56) References Cited

FOREIGN PATENT DOCUMENTS

| | | | | |
|---|---|---|---|---|
| JP | 5267330 B2 | * | 8/2013 | |
| JP | 2016-224677 | | 12/2016 | |
| KR | 101829006 B1 | * | 2/2018 | ............ B60W 30/08 |
| WO | WO 2019/175796 A1 | * | 9/2019 | .......... E01F 15/0492 |

* cited by examiner

RECORDING SYSTEM AND RECORDING METHOD

CROSS-REFERENCE TO RELATED APPLICATIONS

This application is a Continuation of PCT International Application No. PCT/JP2020/009658 filed on Mar. 6, 2020 which claims the benefit of priority from Japanese Patent Application No. 2019-057485 filed on Mar. 25, 2019, the entire contents of which are incorporated herein by reference.

BACKGROUND OF THE INVENTION

1. Field of the Invention

The present disclosure relates to a recording system and a recording method.

2. Description of the Related Art

There is known a technique of detecting an impact on a vehicle by means of acceleration and recording the result as event recording data. In addition, there is known a technique of detecting motion by sensing a change in luminance value or an increase in volume from video data during capturing and, if motion is detected, perform recording (see, e.g., JP 2008-155862 A).

In a case of a collision of a vehicle at low speed, or contact with another vehicle or person at low speed in the vehicle stop state, or the like; in some cases, a vehicle impact cannot be detected from the acceleration, and event recording data may not be saved. In addition, if a sensing threshold of acceleration is set to a low value, the event recording data may be inadvertently recorded even in the case where a vehicle runs on a step or the case where a vehicle's door is open or closed, for example.

SUMMARY OF THE INVENTION

A recording system according to an aspect of the present disclosure includes a recording data acquisition unit, an analysis unit, a learning unit, and a determination unit. The recording data acquisition unit is configured to acquire recording data in which a surrounding situation of a vehicle is recorded. The analysis unit is configured to perform image analysis processing on video data included in the recording data acquired by the recording data acquisition unit to create information regarding a transition of a color component in the video data. The video data is obtained by capturing the surroundings of the vehicle. The learning unit is configured to learn the transition of the color component analyzed by the analysis unit using artificial intelligence to create a trained model used to determine an occurrence of an event. The determination unit is configured to determine whether an event occurs using the trained model learned by the learning unit on a basis of the recording data acquired by the recording data acquisition unit. The event recording control unit is configured to, in a case where the determination unit determines the occurrence of the event, cause a recording unit to record, as event recording data, the recording data including a time point upon the occurrence of the event.

A recording method according to an aspect of the present disclosure includes acquiring recording data in which a surrounding situation of a vehicle is recorded; performing image analysis processing on video data included in the acquired recording data acquired in the acquiring to create information regarding a transition of a color component in the video data, the video data being obtained by capturing the surroundings of the vehicle; learning the transition of the color component obtained through the image analysis processing using artificial intelligence to create a trained model used to determine an occurrence of an event; determining whether an event occurs using the trained model learned in the learning on a basis of the recording data acquired by the recording data acquisition unit; and causing, in a case where the occurrence of the event is determined, cause a recording unit to record, as event recording data, the recording data including a time point upon the occurrence of the event.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Embodiments of a recording system and a recording method according to the present disclosure will be described in detail below with reference to the accompanying drawings. The present invention is not limited to the following embodiments.

First Embodiment

Figure 1:
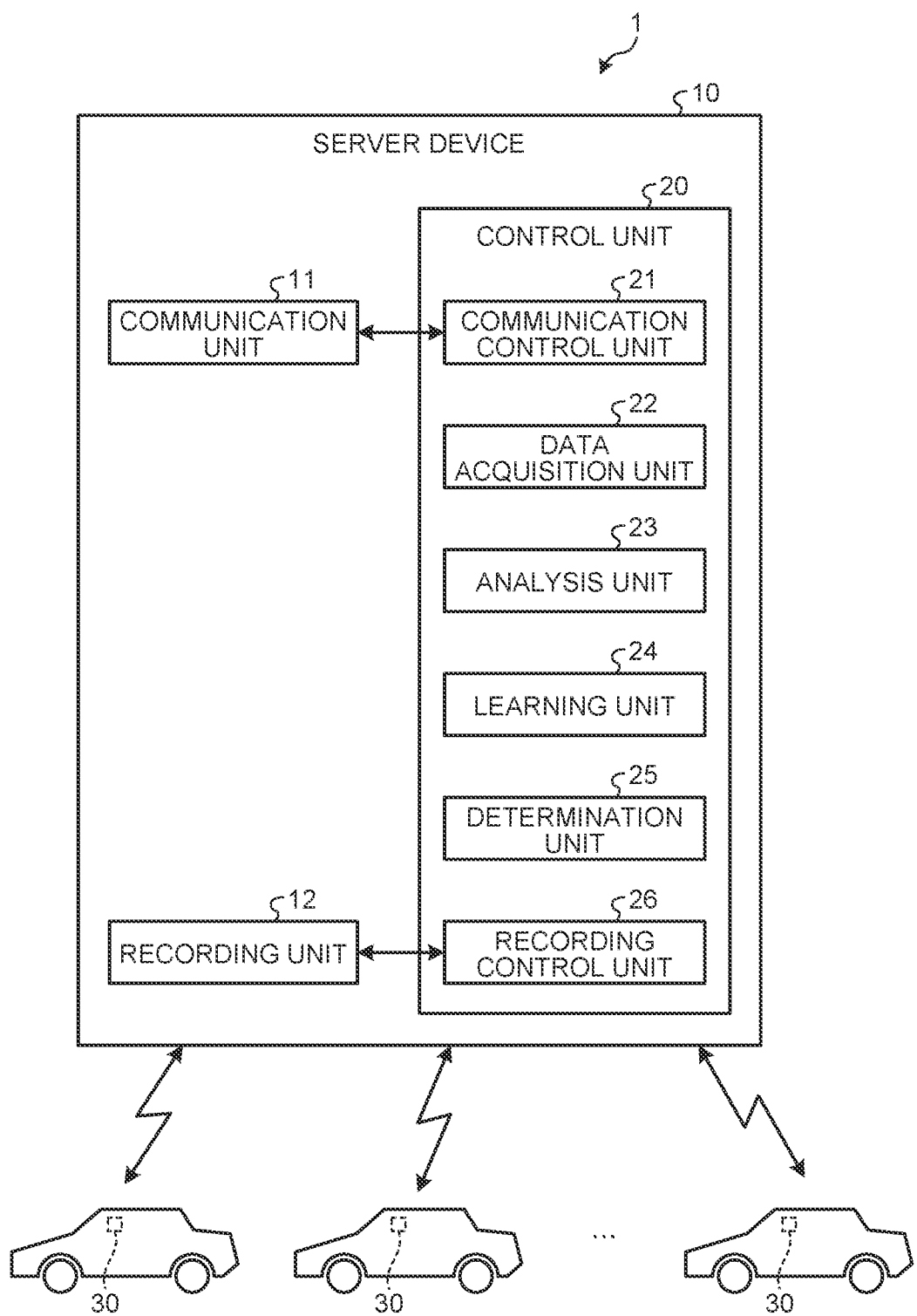
FIG. 1 is a schematic diagram illustrating an exemplary configuration of a recording system according to a first embodiment.

FIG. 1 is a schematic diagram illustrating an exemplary configuration of a recording system according to the first embodiment. The recording system 1 uses a learning model created by machine learning of artificial intelligence (AI), and records an event in a case where there is a large temporal change on a line graph of a predetermined component included in the recording data having surrounding situations recorded. In one example of machine learning, it is trained by deep learning of supervised learning or unsupervised learning, and a multi-layer neural network (hereinafter referred to as "DNN") is created as a trained model. The supervised learning uses recording data as supervisor data. The unsupervised learning does not use recording data as supervisor data. The deep learning is the technique of machine learning that repeatedly updates the weight of DNN to improve the accuracy of determination using DNN and derives the weight of DNN to produce a satisfactory result obtained by the determination using DNN. The technique of machine learning is not limited.

A server device 10 uses the recording data including at least one of video data and audio data upon the occurrence of an event and constructs a DNN as a trained model of determining the occurrence of an event. This determination is done depending on the magnitude of a temporal change on the line graph of the predetermined component included in the recording data upon the occurrence of an event.

The recording data can be acquired from a plurality of recording devices 30 as recording data upon the occurrence of an event. Alternatively, the recording data can be acquired from an external device of an insurance company or the like as the recording data upon the occurrence of an event. The recording data to be acquired is not limited to the recording data upon the occurrence of an event, and can be the recording data when an event does not occur (hereinafter referred to as "normal time"). The recording data can further include type information indicating the type of an event. The method of acquiring the recording data is not limited to these examples.

An example of the type of an event includes a "large impact event" in which the acceleration is equal to or higher than a first threshold, a "minor event" in which the acceleration is less than the first threshold and equal to or higher than a second threshold, or the like. The type of an event can include, in more detail, "rear-end collision at low speed", "contact with another vehicle or person at low speed in the vehicle stop state", or the like.

The first threshold is a value of acceleration that is detectable in the case where a vehicle-related event occurs. The first threshold is, for example, approximately 1 G. The second threshold is less than the first threshold and is the value of acceleration that is detectable when the minor event occurs, such as a rear-end collision of a vehicle at low speed or contact with another vehicle or person at low speed in the vehicle stop state. The second threshold is a value of acceleration that is detectable, for example, even in the case where a vehicle runs on a step or the case where a vehicle's door is open or closed. The second threshold is, for example, approximately 0.5 G.

The large impact event is, for example, a collision at a vehicle speed equal to or higher than a threshold or a collision with another vehicle at the speed of the other vehicle equal to or higher than the threshold. An example of the minor event includes a collision at the speed less than a threshold or a contact with another vehicle or person at the speed less than the threshold in the vehicle stop state.

When acquiring the recording data for determination from the recording device 30, the server device 10 uses the DNN to determine whether an event occurs. The server device 10 includes a communication unit 11, a recording unit 12, and a control unit 20.

The communication unit 11 is a communication unit. The communication unit 11 enables communication with the recording device 30. In the present embodiment, the communication unit 11 is capable of communicating with the recording device 30 always as long as the recording system 1 is operating normally.

The recording unit 12 stores therein recording data to be used in the recording system 1 to construct a DNN. The recording unit 12 records therein line graph information that is analyzed and created by an analysis unit 23 on the basis of the recording data. The recording unit 12 records therein the DNN constructed by a learning unit 24 of the control unit 20.

The control unit 20 is, for example, an arithmetic processing unit (control device) including a central processing unit (CPU) or the like. The control unit 20 loads a recorded program into a memory and executes instructions included in the program. The control unit 20 includes an internal memory (not illustrated) used for temporary recording or the like of data in the control unit 20. The control unit 20 includes a communication control unit 21, a data acquisition unit 22, the analysis unit 23, the learning unit 24, a determination unit 25, and a recording control unit 26.

The communication control unit 21 controls communication with the plurality of recording devices 30 via the communication unit 11. The communication control unit 21 can control communication with an external device via the communication unit 11.

The data acquisition unit 22 acquires the recording data from the plurality of recording devices 30 or the external device. The data acquisition unit 22 outputs the acquired recording data to the recording control unit 26.

The analysis unit 23 creates line graph information by converting information regarding the transition of a predetermined component included in the recording data into the line graph information on the basis of the recording data. The line graph information indicates a temporal change in a predetermined component of the recording data. The analysis unit 23 creates the line graph information of the predetermined component of at least one of video data and audio data that are the recording data. The analysis unit 23 creates the line graph information of the predetermined component of the recording data recorded at the normal time and/or the time of event occurrence. The analysis unit 23 records the created line graph information of the recording data in the recording unit 12.

Given below is a detailed explanation of the method by which the analysis unit 23 creates the line graph information of the video data included in the recording data. The analysis unit 23 performs image processing on the video data to analyze it and generates a line graph for each color component to create line graph information indicating a temporal change in the color component on the line graph. More specifically, first, the analysis unit 23 generates a line graph indicating the ratio of the area occupied by each color component in the video data at each frame of the video data, in other words, at each time of the video data. Then, the analysis unit 23 creates line graph information indicating the temporal change in the ratio of the area of each color component on the line graph. The line graph can be generated for all colors included in the video data. In addition, the line graph can be generated for an object's color obtained by recognizing, through image recognition processing, an object having the possibility of a collision among objects to be captured included in the video data, such as vehicles, motorcycles, people, and obstacles.

The analysis unit 23 can create the ling graph information of a predetermined component on the basis of the recording data upon an occurrence of a past event.

Figure 2A:
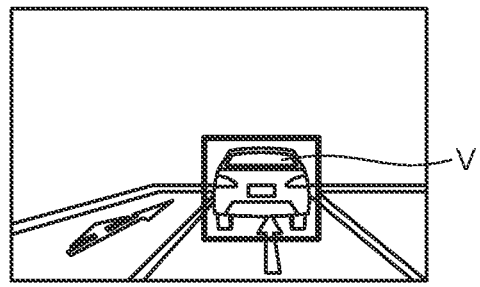
FIGS. 2A and 2B are diagrams for explaining an example of video data upon stopping a vehicle at a position where an appropriate inter-vehicle distance to a preceding vehicle is maintained.
Figure 2A:
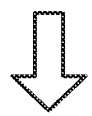
Figure 2B:
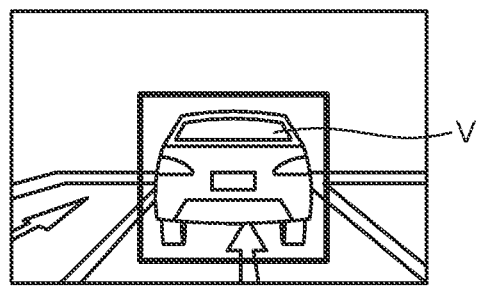
Figure 3:
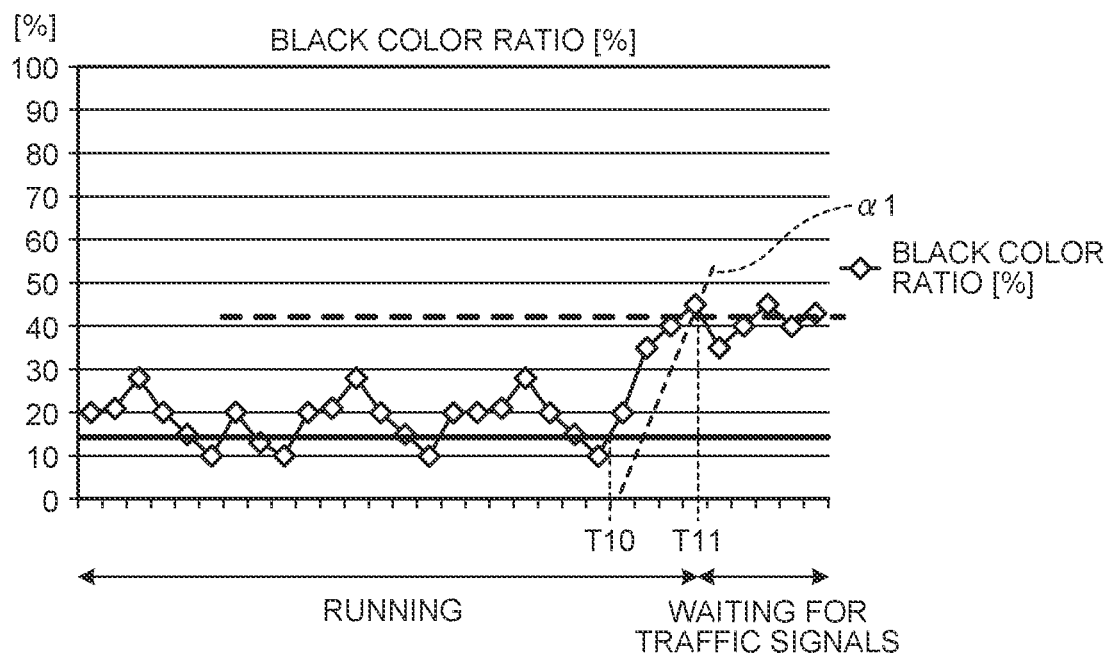
FIG. 3 is a diagram for explaining an example of line graph information of a black-color component of the video data illustrated in FIG. 2.

Given below is an explanation of the line graph information created from the video data at normal times with reference to FIGS. 2A, 2B and 3. FIGS. 2A and 2B are diagrams for explaining an example of video data upon stopping a vehicle at a position where an appropriate inter-vehicle distance to a preceding vehicle is maintained. FIG. 3 is a diagram for explaining an example of line graph information of a black-color component of the video data illustrated in FIGS. 2A and B. FIG. 2A is video data indicating a vehicle running before stopping, and FIG. 2B is video data at the time point when the vehicle stops. A black preceding vehicle V is captured in the video data. In FIGS. 2A and 2B, a rectangular thick line frame represents a region recognized as the preceding vehicle V through the image processing on the video data. The analysis unit 23 first generates a line graph indicating the ratio of an area occupied by a black-color component in the video data at each time of the video data. Then, the analysis unit 23 creates line graph information indicating the temporal change in the area ratio of the black-color component on the line graph. The line graph information obtained as described above is illustrated in FIG. 3. FIG. 3 indicates the line graph information of the black-color component, which is the color of the preceding vehicle V and is created from the video data illustrated in FIGS. 2A and 2B. Assuming that the time point when the vehicle stops, in other words, a time point upon starting waiting for a traffic signal is T11, the black-color component remains at levels around 40% after the time point T11. The average of the black-color components after the time point T11 is marked with a broken line. It can be seen that the black-color components increases from before the time point T11 when the vehicle is stopped. The slope indicating the temporal change in the area ratio of the black-color components from a time point T10 to the time point T11 when the black-color component starts to increase is represented by $\alpha 1$.

Figure 4A:
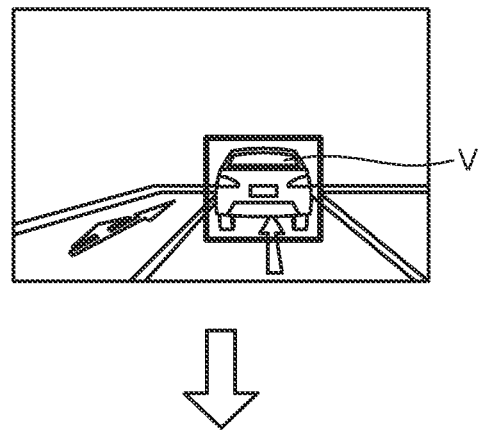
FIGS. 4A and 4B are diagrams for explaining an example of video data upon occurrence of an event.
Figure 4B:
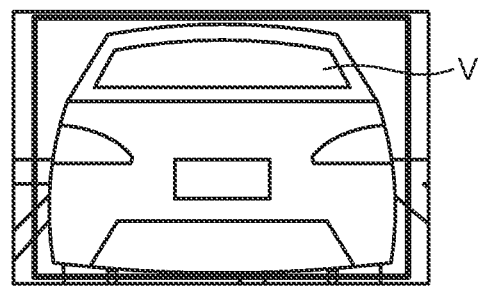
Figure 5:
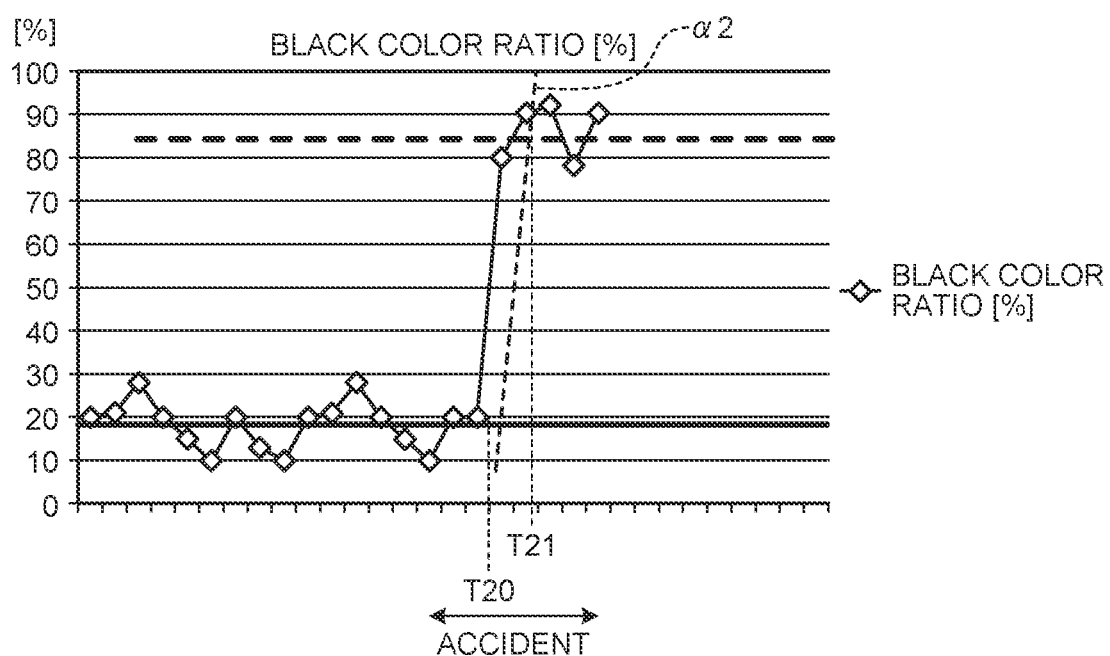
FIG. 5 is a diagram for explaining an example of line graph information of a black-color component of the video data illustrated in FIGS. 4A and 4B.

With reference to FIGS. 4A, 4B and 5, the line graph information created from the video data upon the occurrence of an event in which a low speed collision with a preceding vehicle being stopped is now described. FIGS. 4A and 4B are diagrams for explaining an example of video data upon occurrence of an event. FIG. 5 is a diagram for explaining an example of line graph information of a black-color component of the video data illustrated in FIGS. 4A and 4B. FIG. 4A illustrates video data when a vehicle is running before the occurrence of an event, and FIG. 4B illustrates video data at the time of the occurrence of an event. A black preceding vehicle V is captured in the video data. As described above, the analysis unit 23 creates the line graph information illustrated in FIG. 5 from the video data illustrated in FIGS. 4A and 4B. FIG. 5 indicates line graph information of the black-color component, which is the color of the preceding vehicle V and is created from the video data illustrated in FIGS. 4A and 4B. Assuming that the time of the occurrence of an event is T21, the black-color component remains at levels around 85% after the time point T21. The average of the black-color components after the time point T21 is marked with a broken line. It can be seen that the black-color component rapidly increases from before the time point T21. In one example, the slope indicating the temporal change in the area ratio of the black-color component from a time point T20 to the time point T21 when the black-color component starts to increase rapidly is represented by $\alpha 2$ ($>\alpha 1$). The "ACCIDENT" period in FIG. 5 is an example of the period included in the event recording data.

According to the analysis by the analysis unit 23 as described above, it can be seen that there is a significant difference in the slope indicating the temporal change in the area ratio of the black-color component of the collided preceding vehicle V between the normal time and the time of the occurrence of an event. According to the analysis by the analysis unit 23, it can be seen that the slope at the time upon the occurrence of an event is obviously larger than that at the normal time.

Given below is an explanation of the method by which the analysis unit 23 creates the line graph information of the audio data included in the recording data. The analysis unit 23 performs signal processing on the audio data to analyze it and converts information regarding the transition of the loudness of sound of each frequency component into line graph information to create the ling graph information. More specifically, first, the analysis unit 23 generates a line graph indicating the loudness of sound of each frequency component included in the audio data at each time of the audio data. Then, the analysis unit 23 creates line graph information indicating the temporal change in each frequency component on the line graph. The line graph can be generated for all frequency components included in the audio data or can be generated for a specific frequency component occurring upon the occurrence of an event, excluding road noise or the like, among the frequencies included in the audio data.

Figure 6:
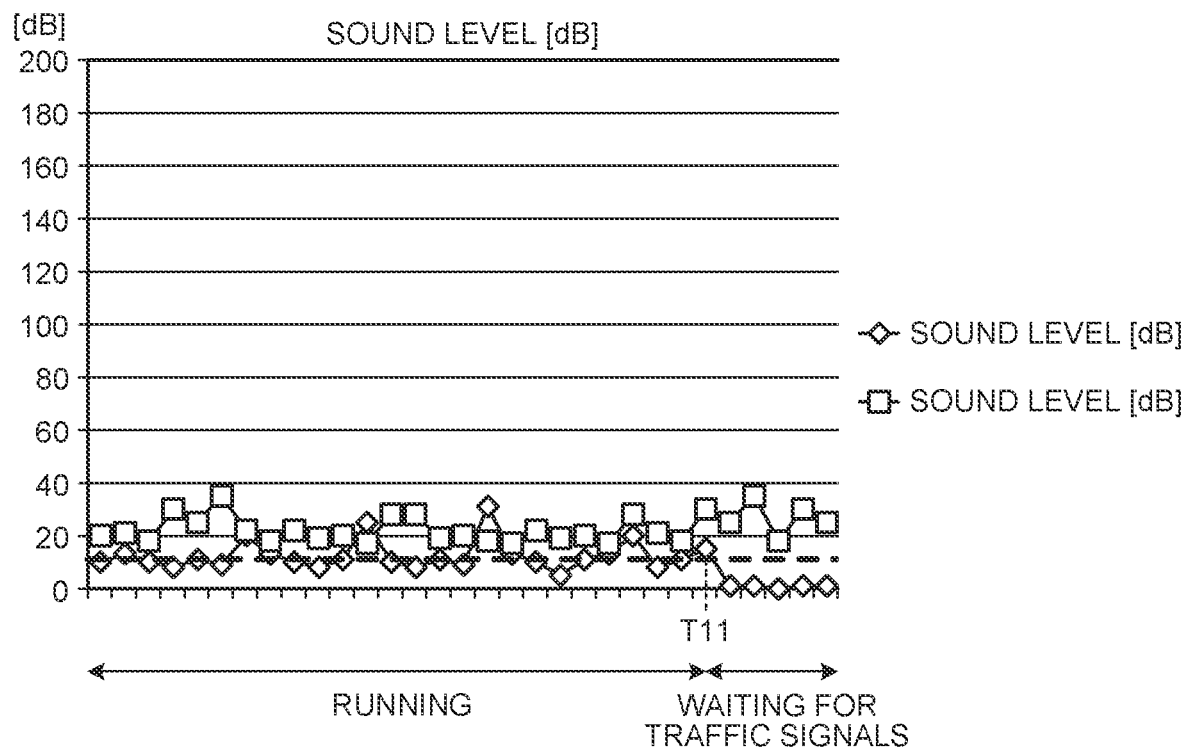
FIG. 6 is a diagram for explaining an example of a line graph of a predetermined frequency in audio data upon stopping a vehicle at a position where an appropriate inter-vehicle distance to a preceding vehicle is maintained.

The line graph information created from the audio data at normal time is now described with reference to FIG. 6. FIG. 6 is a diagram for explaining an example of a line graph of a predetermined frequency in audio data upon stopping a vehicle at a position where an appropriate inter-vehicle distance to a preceding vehicle is maintained. The rhombus indicates the specific frequency component occurring upon the occurrence of an event, and the square indicates a frequency component caused by the music being played on the vehicle audio. In the entire audio data, the frequency component indicated by the square remains at levels around 18 dB. Assuming that the time when the vehicle stops, in other words, a time point upon starting waiting for a traffic signal is T11, the frequency component indicated by the rhombus remains at levels around 0 dB after the time point T11. The frequency components that are represented by the rhombus change between after T11 when the vehicle stops and before T11. The average of the frequency components represented by rhombus in the entire audio data is marked with a broken line.

Figure 7:
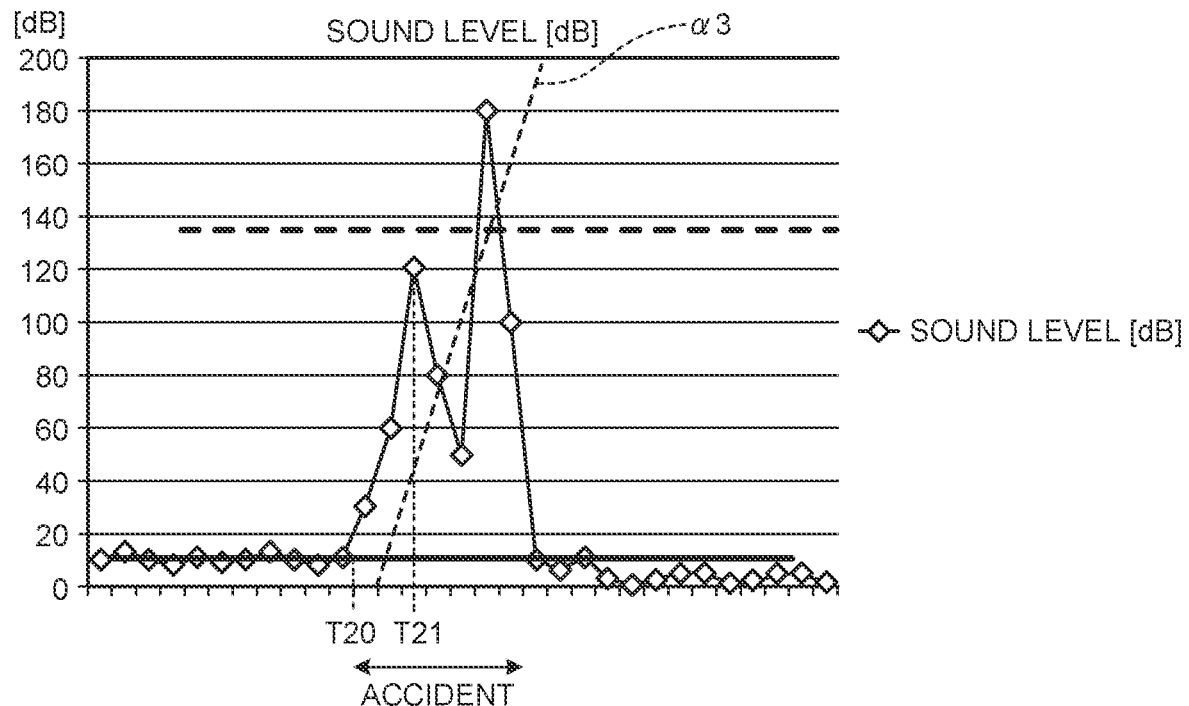
FIG. 7 is a diagram for explaining an example of a line graph of a predetermined frequency in the audio data upon occurrence of an event.

Referring to FIG. 7, the line graph information created from the audio data upon the occurrence of an event in which a low speed collision with a preceding vehicle being stopped is described. FIG. 7 is a diagram for explaining an example of a line graph of a predetermined frequency in the audio data upon occurrence of an event. Assuming that the time point upon the occurrence of an event is T21, the frequency component represented by the rhombus remains at levels around 112 dB after the time point T21. The average of the frequency components represented by the rhombus after the time point T21 is marked with the broken line. It can be seen that the frequency component represented by the rhombus rapidly increases immediately before the time point T21. The slope indicating the temporal change on the line graph of the frequency component represented by the rhombus from a time point T20 to the time point T21 when the frequency component indicated by the rhombus starts to increase rapidly is indicated by $\alpha 3$. The "ACCIDENT" period in FIG. 7 is an example of the period included in the event recording data. The average of the frequency components represented by the rhombus in the entire audio data is marked with the solid line.

According to the analysis by the analysis unit 23 as described above, it can be seen that the specific frequency component generated at the time upon the occurrence of an event obviously appears large only upon the occurrence of an event.

The learning unit 24 reads the transition of a predetermined component from the line graph information created by the analysis unit 23, learns it using artificial intelligence, and constructs a DNN as a trained model for determining the occurrence of an event. In one example, the learning unit 24 learns the weight of a DNN as a trained model for determining the occurrence of an event by using the line graph information that is the supervisor data. The configuration and weight of the DNN are called a DNN model. The learning in the learning unit 24 can be performed in a similar manner to the learning in the known deep learning.

In one example, the learning unit 24 performs the learning using artificial intelligence to acquire, from the line graph information, data of a predetermined component having a large slope indicating that a temporal change on the line graph around the event occurrence time is large. Furthermore, the learning unit 24 learns using artificial intelligence to acquire, from the data of the predetermined component having a large slope indicating that the temporal change on the line graph is large, a time point when the temporal change on the line graph is rapid. When acquiring the time point when the temporal change on the line graph is rapid, the learning unit 24 learns the time point as the time of the occurrence of an event. In this way, the learning unit 24 performs the learning using artificial intelligence to construct a DNN for determining the occurrence of an event on the basis of a pattern of change of the line graph, the tendency of change of the line graph, the rate of change of the line graph, or the like, from the line graph information.

In one example, the learning unit 24 inputs the line graph information of the recording data for the case of "occurrence of event" to the DNN and executes deep learning. Then, the weight during learning is updated on the basis of whether a correct determination result is output as "occurrence of event" or an erroneous determination result is output as "no occurrence of event". In addition, the learning unit 24 inputs the recording data for the case of "no occurrence of event" to the DNN and executes deep learning. Then, the weight during learning is updated on the basis of whether a correct determination result is output as "no occurrence of event" or an erroneous determination result is output as "occurrence of event". The repetition of such processing allows the learned weight to be obtained by performing the learning. The learning unit 24 outputs a DNN model including the weight of the DNN to the recording unit 12.

Further, the learning unit 24 can learn the type of an event together with the occurrence of an event. More specifically, the learning unit 24 can perform the learning using artificial intelligence on the basis of the line graph information created from the recording data at the time of the occurrence of a large impact event and at the time of the occurrence of a minor event. Thus, the learning unit 24 can specify the type of an event to construct a DNN for determining the occurrence of an event.

The learning unit 24 can construct a DNN for determining the occurrence of an event by performing the learning using artificial intelligence on the basis of at least one of the line graph information of the video data and the line graph information of the audio data. It is preferable that the learning unit 24 constructs a DNN on the basis of at least the line graph information of the video data among the line graph information of the video data and the line graph information of the audio data.

The learning unit 24 updates the DNN model and records the updated model in the recording unit 12 every time data is acquired from the data acquisition unit 22 at a predetermined interval or at the desired timing.

The learning unit 24 may learn a tendency of change in each component included in the recording data upon the occurrence of the event using artificial intelligence on a basis of the recording data upon an occurrence of a previous event.

In the case where the recording data to be used for determination is acquired from the recording device 30, the determination unit 25 determines the occurrence of an event using the DNN. More specifically, the determination unit 25 reads the trained DNN model from the recording unit 12, reproduces the DNN, and determines the occurrence of an event from the recording data for determination. The determination in the determination unit 25 can be executed similarly to the determination in the known deep learning.

In the case where the recording data for determination is acquired from the recording device 30, the determination unit 25 can determine the type of an event together with the occurrence of an event by using the DNN.

The recording control unit 26 causes the recording unit 12 to record the recording data acquired by the data acquisition unit 22. The recording control unit 26 causes the recording unit 12 to record the line graph information created by the analysis unit 23 as the supervisor data to be used in the recording system 1. In the case where the analysis unit 23 creates the line graph information, the recording control unit 26 updates the supervisor data recorded in the recording unit 12. The recording control unit 26 causes the recording unit 12 to record the DNN constructed by the learning unit 24. The recording control unit 26 updates the DNN model recorded by the recording unit 12 every time the learning unit 24 learns the DNN model.

Figure 8:
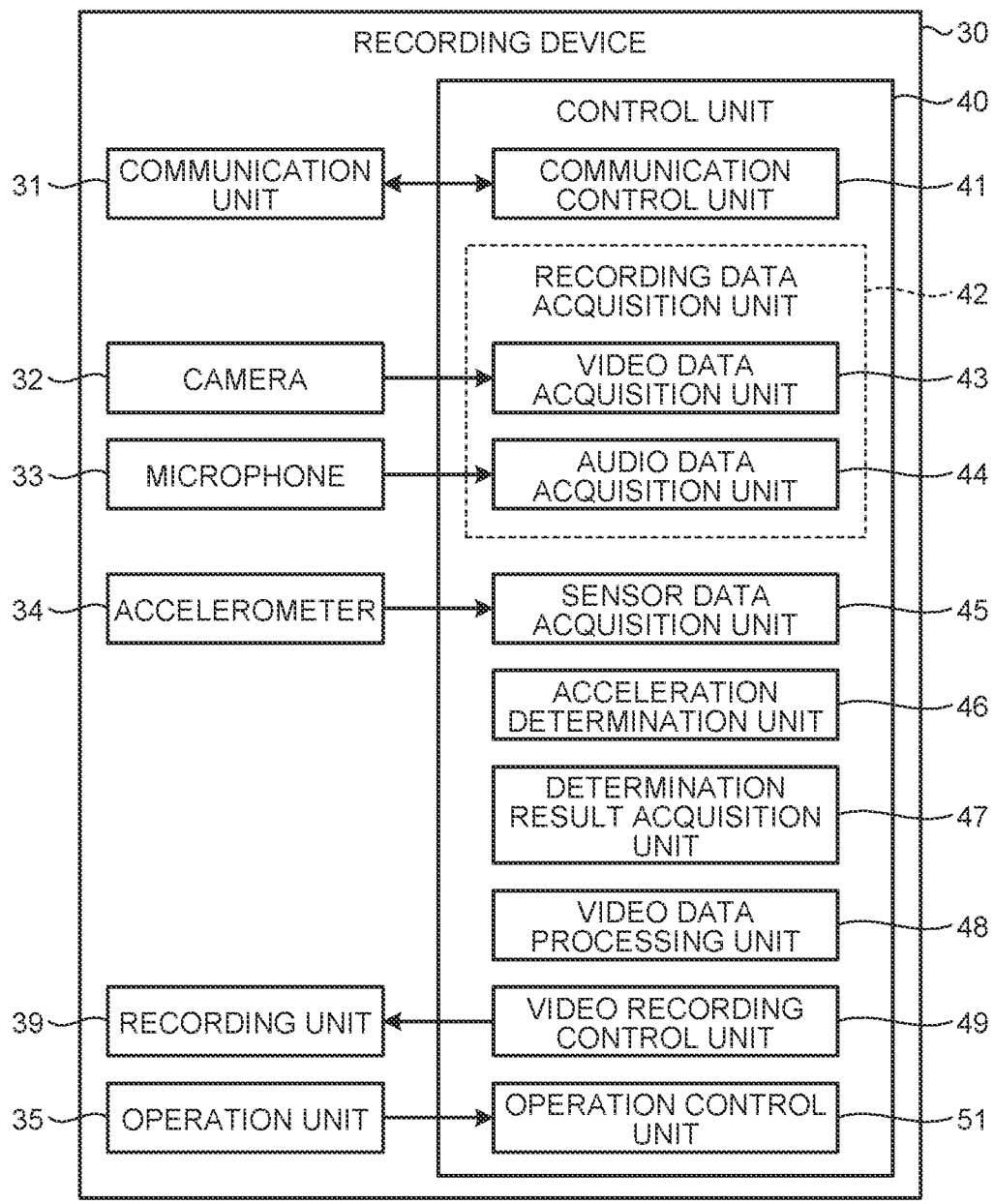
FIG. 8 is a schematic diagram illustrating an exemplary configuration of a recording device according to the first embodiment.

The description is given of the recording device 30 with reference to FIG. 8. FIG. 8 is a schematic diagram illustrating an exemplary configuration of a recording device according to the first embodiment. The recording device 30 is arranged, in one example, in a vehicle. In the present embodiment, the recording device 30 is a so-called driving recorder for vehicles. The recording device 30 has a function as an image capturing device. The recording device 30 includes a communication unit 31, a camera 32, a microphone 33, an accelerometer 34, an operation unit 35, a recording unit 39, and a control unit 40.

The recording device 30 captures and records the surroundings of a vehicle. The recording device 30 causes the server device 10 to determine whether an event has occurred in a vehicle on the basis of the video data obtained by capturing the surroundings of a vehicle. In the case where an event is determined to occur, the recording device 30 records the event recording data.

The communication unit 31 is a communication unit. The communication unit 31 enables communication with the server device 10. In the present embodiment, the communication unit 31 is capable of communicating with the server device 10 always as long as the recording system 1 is operating normally.

The camera 32 is a camera that captures the surroundings of a vehicle as video data. The camera 32 can be provided singly or in plural. The camera 32 performs all-time capturing while the engine of a vehicle is turned on. The camera 32 outputs the captured video data to a video data acquisition unit 43 of the control unit 40. The video data is, for example, a moving image including an image of 30 frames per second.

The microphone 33 is a microphone that acquires audio data around the vehicle. The microphone 33 can be provided singly or in plural. The microphone 33 outputs the acquired audio data to an audio data acquisition unit 44 of the control unit 40.

The accelerometer 34 is a sensor that detects the acceleration of the vehicle. The accelerometer 34 outputs the sensor data that is a detected result to a sensor data acquisition unit 45 of the control unit 40. The accelerometer 34 is, for example, a sensor that detects acceleration in three axial directions. The three-axis directions are front-rear direction, left-right direction, and up-down direction of a vehicle.

The operation unit 35 accepts various operations to be performed on the recording device 30. In one example, the operation unit 35 enables a power on/off operation, a captured video data saving operation, an erasing operation, or the like. The operation unit 35 outputs the operation information to an operation control unit 51 of the control unit 40.

The recording unit 39 is used for performing recording or other processing of the data to the recording device 30. The recording unit 39 is, for example, a semiconductor memory device such as random-access memory (RAM) or flash memory or a recording unit such as a memory card. Alternatively, it can be an external recording unit connected in a wireless mode via the communication unit 31. The recording unit 39 records the video data on the basis of the control signal output from a video recording control unit (an event recording control unit) 49 of the control unit 40.

The control unit 40 is, for example, an arithmetic processing unit (control device) including a CPU or the like. The control unit 40 loads a recorded program into a memory and executes instructions included in the program. The control unit 40 includes an internal memory (not illustrated) used for temporary recording or the like of data in the control unit 40. The control unit 40 includes a communication control unit 41, a recording data acquisition unit 42, the sensor data acquisition unit 45, an acceleration determination unit 46, and a determination result acquisition unit 47, a video data processing unit 48, the video recording control unit 49, and the operation control unit 51. The recording data acquisition unit 42 includes the video data acquisition unit 43 and the audio data acquisition unit 44.

The communication control unit 41 controls communication with the server device 10 via the communication unit 31. In the present embodiment, the communication control unit 41 controls so that the video data acquired by the video data acquisition unit 43 and the audio data acquired by the audio data acquisition unit 44 are transmitted to the server device 10.

The recording data acquisition unit 42 acquires the recording data indicating situations around the vehicle. The recording data acquisition unit 42 includes the video data acquisition unit 43 and the audio data acquisition unit 44.

The video data acquisition unit 43 acquires video data obtained by capturing the surroundings of a vehicle. More specifically, the video data acquisition unit 43 acquires the video data of the surroundings of a vehicle, which is output by the camera 32 arranged in the vehicle, and outputs it to the video data processing unit 48. The video data is included in the recording data.

The audio data acquisition unit 44 acquires audio data obtained by recording sound around a vehicle. More specifically, the audio data acquisition unit 44 acquires audio data around a vehicle, which is output by the microphone 33 arranged in the vehicle. The audio data is included in the recording data.

The sensor data acquisition unit 45 acquires sensor data of the accelerometer 34. The sensor data acquisition unit 45 outputs the acquired sensor data to the acceleration determination unit 46.

The acceleration determination unit 46 detects whether the acceleration equal to or higher than a first threshold is detected on the basis of the sensor data of the accelerometer 34. If it is determined that the acceleration equal to or higher than the first threshold is detected, the acceleration determination unit 46 determines that an event has occurred. If it is not determined that the acceleration equal to or higher than the first threshold is detected, the acceleration determination unit 46 detects whether the acceleration equal to or higher than a second threshold is detected. If it is determined that the acceleration equal to or higher than the second threshold is detected, the acceleration determination unit 46 executes a determination result acquisition process to cause the server device 10 to determine whether an event has occurred. If it is not determined that the acceleration equal to or higher than the second threshold is detected, the acceleration determination unit 46 determines that no event occurs.

The determination result acquisition unit 47 acquires a determination result obtained by the determination performed by the server device 10 as to whether an event has occurred.

The video data processing unit 48 converts the captured video data into any file format, such as MP4, encoded using any codec such as H.264 or moving picture experts group (MPEG-4). The period of the video data created as a file is, for example, 60 seconds, but is not limited to this example. In addition, the video data can be data including sound in addition to the video captured by the camera 32.

The video data processing unit 48 creates loop-recorded video data for each video in a predetermined period, for example, 60 seconds from the video data recorded in a buffer memory (not illustrated).

Further, if it is determined that the acceleration determination unit 46 detects an event or if the determination result acquired by the determination result acquisition unit 47 indicates the occurrence of an event, the video data processing unit 48 creates video data including at least the time point upon the occurrence of an event, as the event recording data, from the loop-recorded video data. It is preferable that the video data processing unit 48 creates video data including a predetermined period around the time point upon the occurrence of an event as the event recording data. In one example, the video data processing unit 48 creates video data obtained by cutting out a predetermined period around the time point upon the occurrence of an event as the event recording data. Alternatively, in one example, the video data processing unit 48 can create video data in units of loop-recorded video data including a predetermined period around the time point upon the occurrence of an event as the event recording data.

The video recording control unit 49 controls so that the recording unit 39 records the video data filed by the video data processing unit 48.

The video recording control unit 49 causes the recording unit 39 to record the created loop-recorded video data. In the case where the capacity of the recording unit 39 is full, the video recording control unit 49 overwrites and records new loop-recorded video data on the oldest loop-recorded video data.

Further, in the case where an event is detected, the video recording control unit 49 records and saves the video data including at least the time point upon the occurrence of an event in the recording unit 39 as the event recording data. More specifically, in the case where an event is detected, the video recording control unit 49 detects an event, the video recording control unit 49 records and saves the event recording data created by the video data processing unit 48 including the time point upon the occurrence of an event in the recording unit 39.

The operation control unit 51 acquires operation information of the operation received by the operation unit 35. In one example, the operation control unit 51 acquires operation information such as a power on/off operation, a captured video data saving operation, and an erasing operation.

Figure 9:
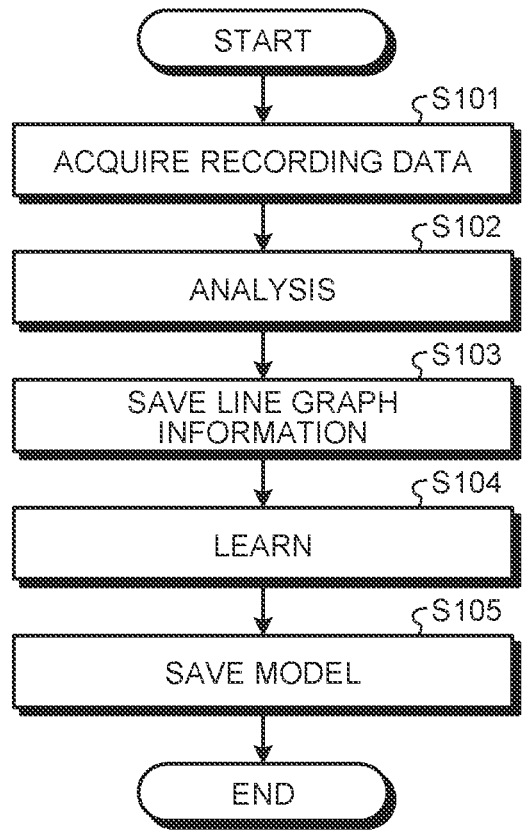
FIG. 9 is a flowchart illustrating the procedure of learning process in a server device according to the first embodiment.
Figure 10:
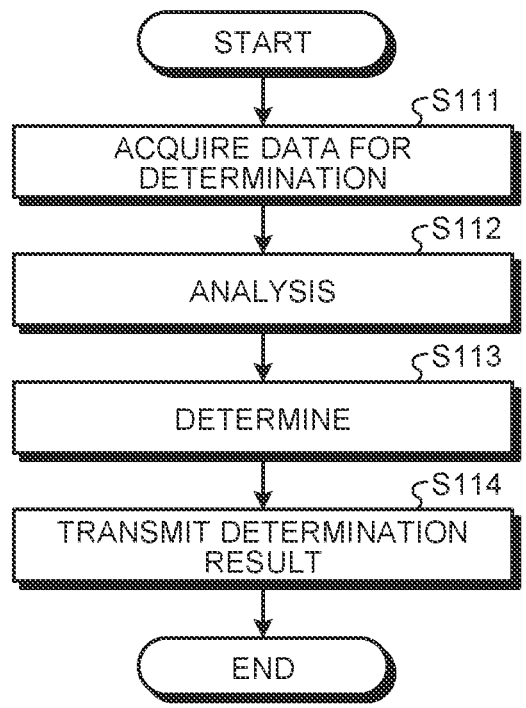
FIG. 10 is a flowchart illustrating the procedure of determination process in the server device according to the first embodiment.
Figure 11:
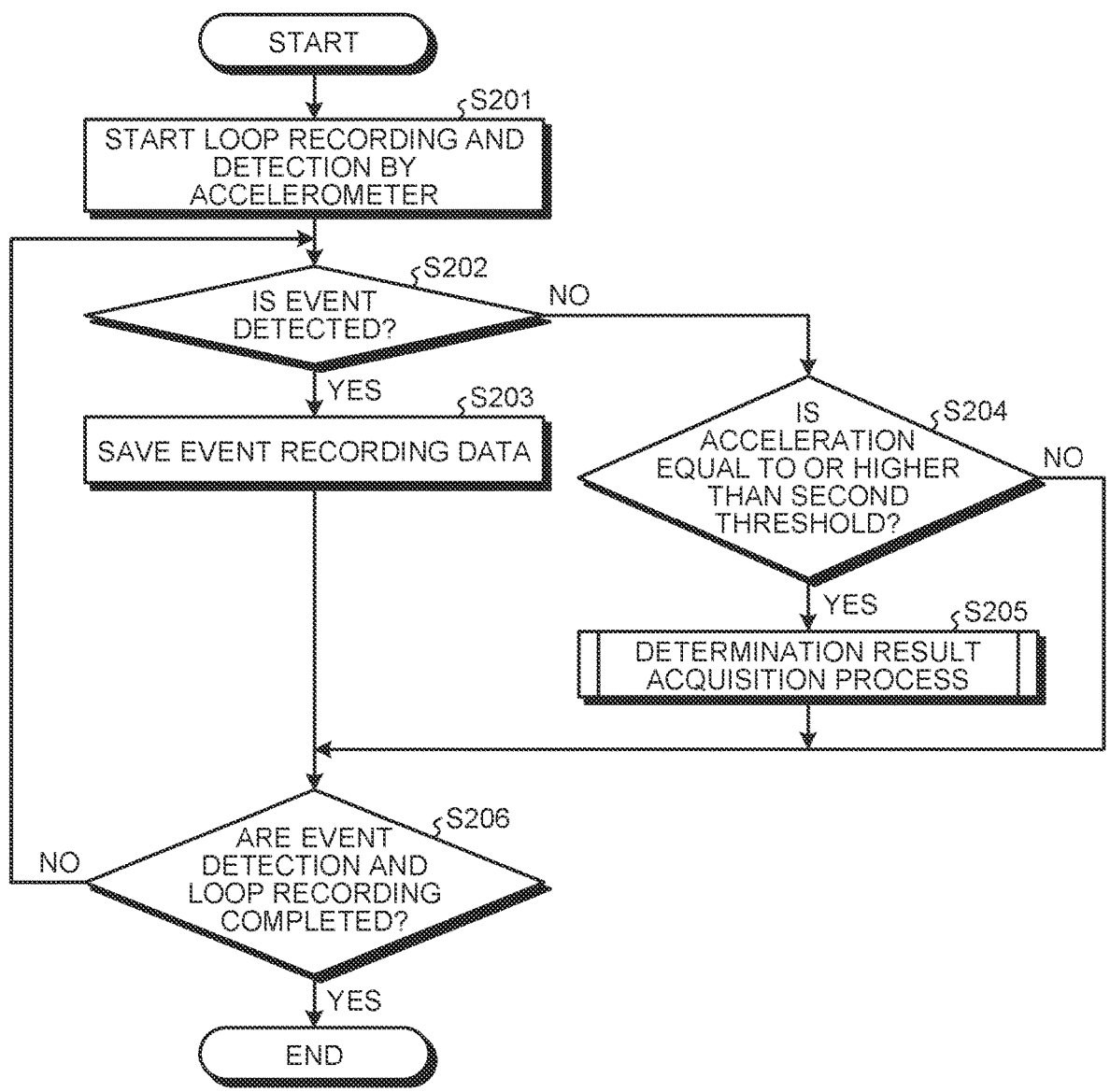
FIG. 11 is a flowchart illustrating the processing procedure in the recording device according to the first embodiment.
Figure 12:
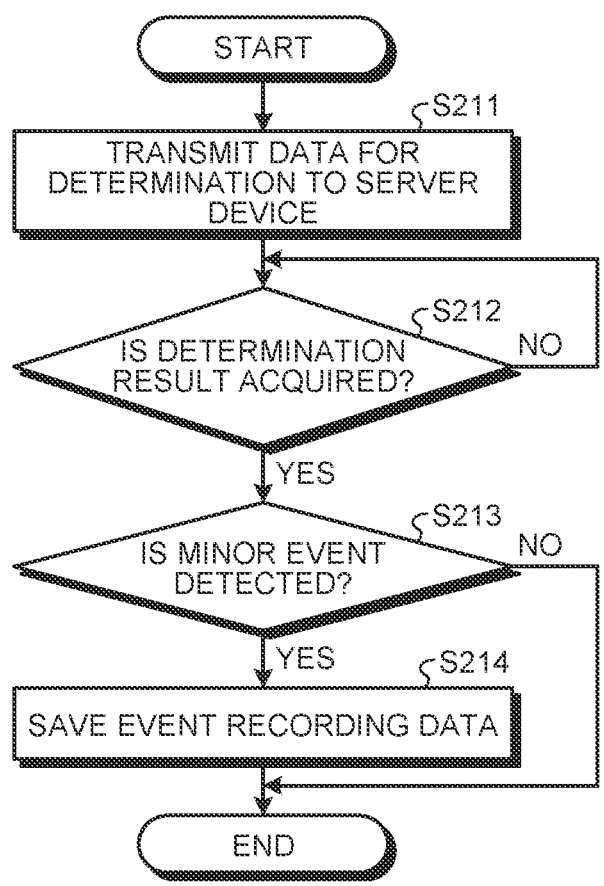
FIG. 12 is a flowchart illustrating the processing procedure in the recording device according to the first embodiment.

The method of recording an event and the operation by the recording system 1 are now described with reference to FIGS. 9 to 12. FIG. 9 is a flowchart illustrating the procedure of learning process in a server device according to the first embodiment. FIG. 10 is a flowchart illustrating the procedure of determination process in the server device according to the first embodiment. FIG. 11 is a flowchart illustrating the processing procedure in the recording device according to the first embodiment. FIG. 12 is a flowchart illustrating the processing procedure in the recording device according to the first embodiment.

Given below is an explanation of the learning process in the server device 10 with reference to FIG. 9. In the server device 10, the control unit 20 causes the data acquisition unit 22 to acquire the recording data (step S101). The control unit 20 causes the recording control unit 26 to record the acquired recording data in the recording unit 12. The control unit 20 proceeds to step S102.

The control unit 20 causes the analysis unit 23 to analyze the recording data recorded in the recording unit 12 to create line graph information, that is, a transition of a predetermined component included in the recording data (step S102). The control unit 20 proceeds to step S103.

The control unit 20 causes the recording control unit 26 to save the created line graph information as supervisor data in the recording unit 12 (step S103). The control unit 20 proceeds to step S104.

The control unit 20 causes the learning unit 24 to learn the weight of a DNN by artificial intelligence as a trained model of determining the occurrence of an event by using the line graph information that is the supervisor data recorded in the recording unit 12 (step S104). The control unit 20 proceeds to step S105.

The control unit 20 causes the recording control unit 26 to save the generated DNN in the recording unit 12 (step S105). The control unit 20 ends the processing.

In this way, the DNN is constructed in advance in the server device 10 before the processing in the recording device 30 of the recording system 1 is executed. The server device 10 updates the DNN model every time data is acquired from the data acquisition unit 22 at predetermined intervals or at the desired timing.

Given below is an explanation of the determination process in the server device 10 with reference to FIG. 10. In the server device 10, the control unit 20 causes the data acquisition unit 22 to acquire the recording data used for determination from the recording device 30 (step S111). The control unit 20 proceeds to step S112.

The control unit 20 causes the analysis unit 23 to analyze the acquired recording data used for determination to create line graph information (step S112). The control unit 20 proceeds to step S113.

The control unit 20 causes the determination unit 25 to determine the occurrence of an event by using the DNN on the basis of the line graph information created from the recording data used for determination (step S113). The control unit 20 proceeds to step S114.

The control unit 20 causes the communication control unit 21 to transmit a determination result to the recording device 30 (step S114). The control unit 20 ends the processing.

Given below is an explanation of the recording process in the recording device 30 with reference to FIG. 11. The control unit 40 starts the loop recording and the detection by the accelerometer 34 (step S201). More specifically, the control unit 40 causes the video data processing unit 48 to start the loop recording. The control unit 40 causes the accelerometer 34 to start the detection of the acceleration. The control unit 40 proceeds to step S202.

The control unit 40 causes the acceleration determination unit 46 to determine whether an event is detected (step S202). More specifically, the acceleration determination unit 46 determines whether an event is detected depending on whether the acceleration that is the sensor data is equal to or higher than a first threshold. If the acceleration determination unit 46 determines that the acceleration is equal to or higher than the first threshold (Yes in step S202), the processing proceeds to step S203. If it is determined that the acceleration is equal to or higher than the first threshold (Yes in step S202), an event having a large impact occurs. If the acceleration determination unit 46 does not determine that the acceleration is equal to or higher than the first threshold (No in step S202), the control unit 40 proceeds to step S204.

If the acceleration is determined to be equal to or higher than the first threshold (Yes in step S202), the control unit 40 saves the event recording data that is video data around the detection of an event (step S203). More specifically, the control unit 40 causes the video data processing unit 48 to generate video data including at least the time point upon the occurrence of an event from the loop-recorded video data recorded in a buffer memory as the event recording data. The control unit 40 causes the video recording control unit 49 to save the generated event recording data in the recording unit 39. The control unit 40 proceeds to step S206.

If it is not determined that the acceleration is equal to or higher than the first threshold (No in step S202), the control unit 40 causes the acceleration determination unit 46 to determine whether the acceleration, which is the sensor data, is equal to or higher than a second threshold (step S204). If the acceleration determination unit 46 determines that the acceleration is equal to or higher than the second threshold (Yes in step S204), the processing proceeds to step S205. If the acceleration determination unit 46 does not determine that the acceleration is equal to or higher than the second threshold (No in step S204), the control unit 40 proceeds to step S206.

If it is determined that the acceleration is equal to or higher than the second threshold (Yes in step S204), the control unit 40 executes the determination result acquisition process (step S205). The control unit 40 proceeds to step S206.

The control unit 40 determines whether to terminate the event detection and the loop recording (step S206). More specifically, the control unit 40 determines that the event detection and the loop recording are completed under optional situations such as outputting completion operation information or completing the vehicle's operation by the operation control unit 51 (Yes in step S206), and ends the processing. The control unit 40 determines that the event detection and the loop recording are not completed unless the completion operation information is output by the operation control unit 51 (No in step S206), and executes the process of step S202 again.

Given below is an explanation of the determination result acquisition process in step S205 of the flowchart illustrated in FIG. 11 with reference to FIG. 12. The control unit 40 transmits the video data obtained by starting the capturing in step S201 to the server device 10 as the data used for determination by the determination result acquisition unit 47 in a state where the acceleration determination unit 46 determines that an acceleration equal to or higher than the second threshold is detected (step S211). The control unit 40 proceeds to step S212.

The control unit 40 determines whether the determination result is acquired from the server device 10 by the determination result acquisition unit 47 (step S212). If the control unit 40 determines that the determination result is acquired (Yes in step S212), the processing proceeds to step S213. If it is not determined that the determination result is acquired (No in step S212), the control unit 40 re-executes the process of step S212.

If it is determined that the determination result is acquired (Yes in step S212), the control unit 40 determines whether the determination result indicates that a minor event occurs (step S213). If the control unit 40 determines that the determination result indicates that the minor event occurs (Yes in step S213), the processing proceeds to step S214. If the determination result does not indicate that a minor event occurs (No in step S213), the control unit 40 ends the processing.

If the determination result is determined that a minor event occurs (Yes in step S213), the control unit 40 saves the event recording data (step S214). The control unit 40 ends the processing.

In this way, the server device 10 analyzes the recording data to create the line graph information, uses the line graph information to perform machine learning by artificial intelligence, and constructs a DNN as a trained model used for determining the occurrence of an event. In the case where the recording data used for determination is acquired from the recording device 30, the server device 10 analyzes it to create the line graph information and uses the DNN to determine the occurrence of an event.

If the speed is less than the first threshold and equal to or higher than the second threshold, the recording device 30 causes the server device 10 to determine whether an event occurs by using the DNN on the basis of the video data obtained by the camera 32 capturing the surroundings.

As described above, in the present embodiment, the server device 10 analyzes the recording data, creates the line graph information, performs machine learning by artificial intelligence using the line graph information, and constructs the DNN as the trained model used to determine the occurrence of an event. In the present embodiment, the server device 10, when acquiring the recording data used for determination from the recording device 30, analyzes the acquired recording data, creates the line graph information, and determines the occurrence of an event using the DNN.

According to the present embodiment, in the case where the acceleration is less than the first threshold and equal to or higher than the second threshold, it is possible to construct a DNN to determine whether a minor event occurs appropriately.

In the present embodiment, in the case where the acceleration is less than the first threshold and equal to or higher than the second threshold, the recording device 30 causes the server device 10 to determine whether an event occurs by using the DNN, on the basis of the video data obtained by the camera 32 capturing the surroundings.

In this way, according to the present embodiment, it is possible to record the event recording data, for example, in the case where a minor event occurs in a vehicle, such as no detection of the acceleration equal to or higher than the first threshold, including a vehicle's collision at low speed or contact with another vehicle or person at low speed in the vehicle stop state.

In the present embodiment, in the case where the acceleration equal to or higher than the second threshold is detected, the event recording data is recorded only when a minor event of the vehicle occurs. In the present embodiment, in the case where the acceleration equal to or higher than the second threshold is detected when the vehicle runs on a step or the like, it is possible to prevent the event recording data from being recorded. The present embodiment makes it possible to appropriately record the event recording data.

Second Embodiment

Figure 13:
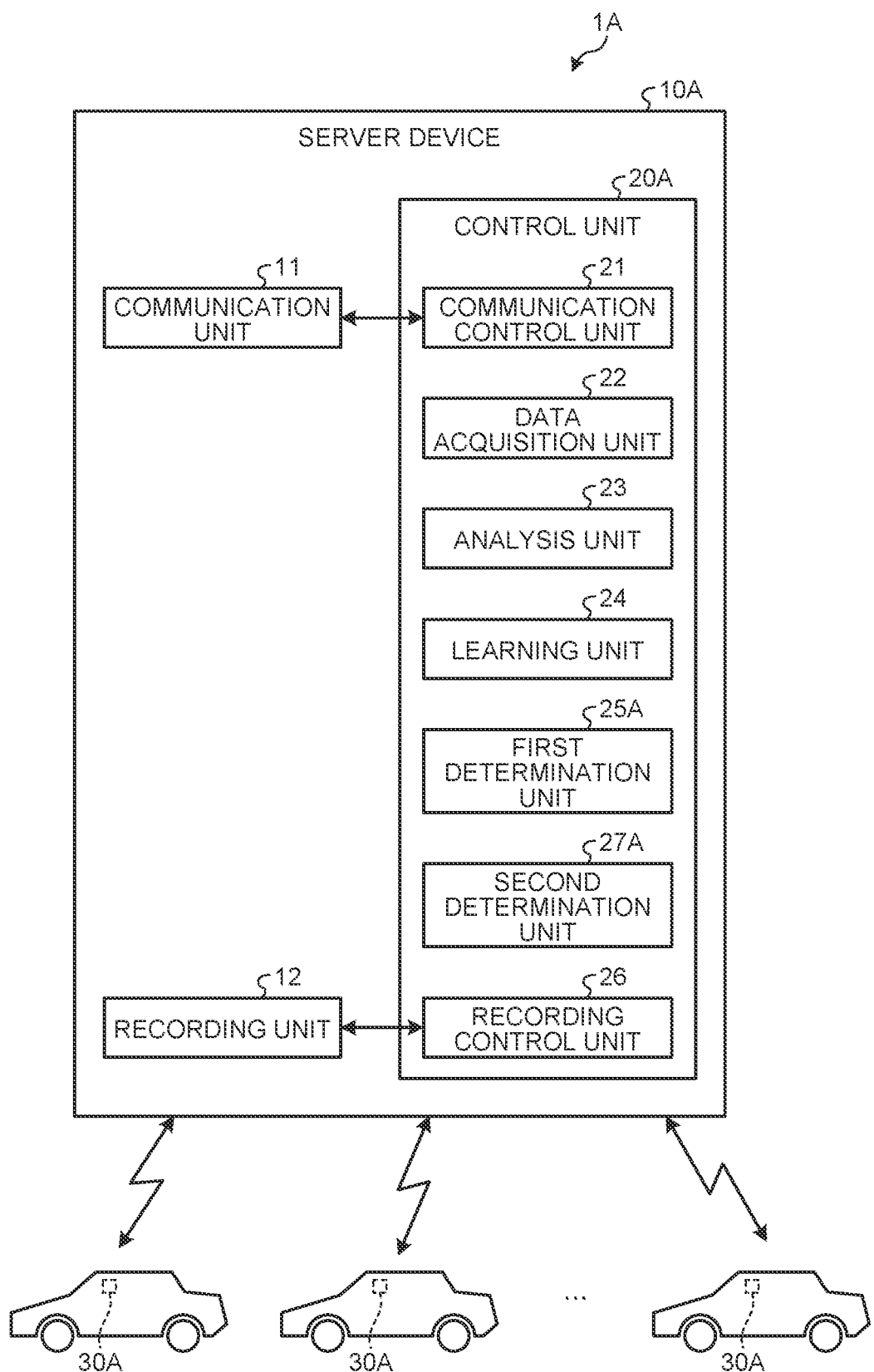
FIG. 13 is a schematic diagram illustrating an exemplary configuration of a recording system according to a second embodiment.
Figure 14:
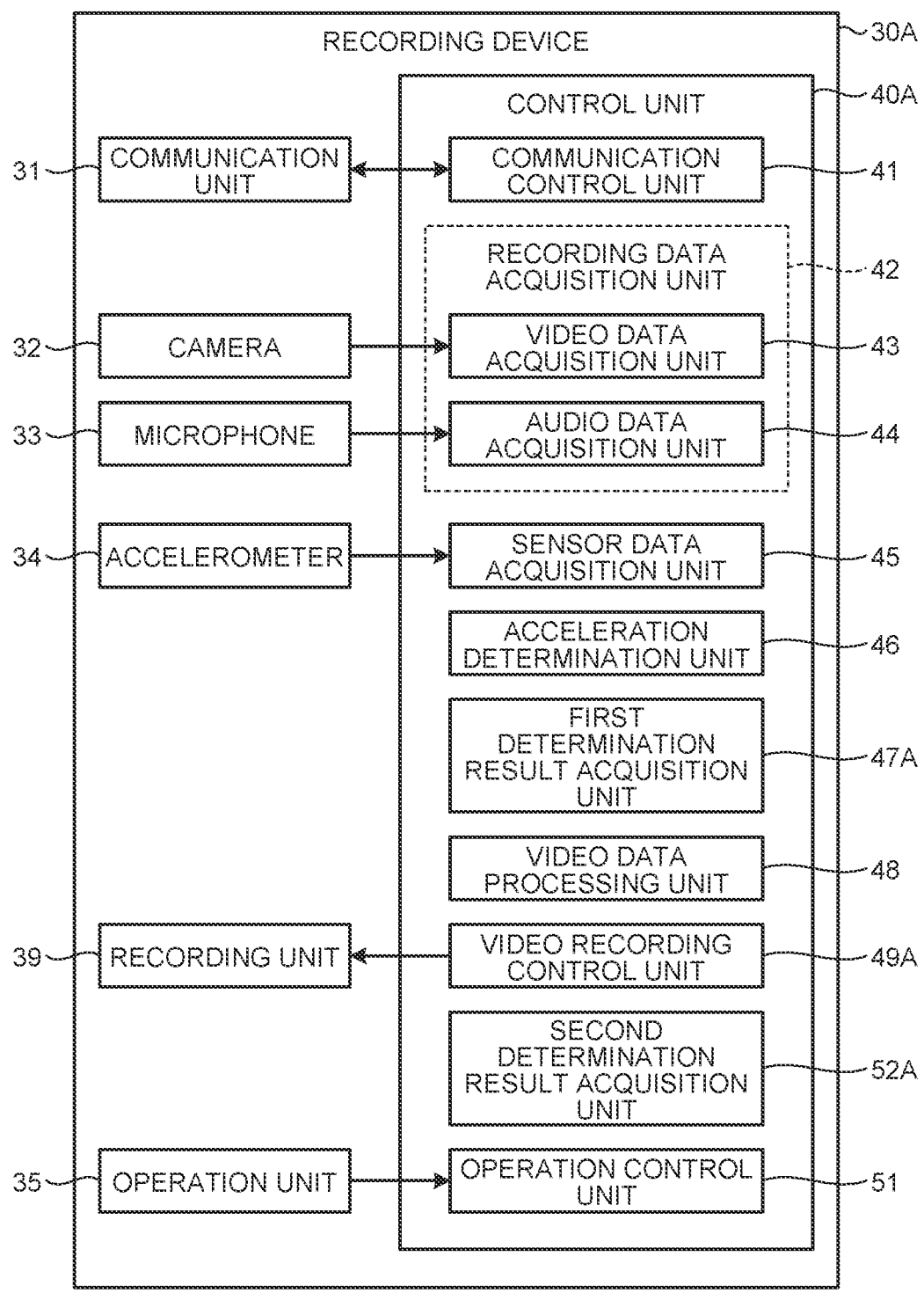
FIG. 14 is a schematic diagram illustrating an exemplary configuration of a recording device according to the second embodiment.
Figure 15:
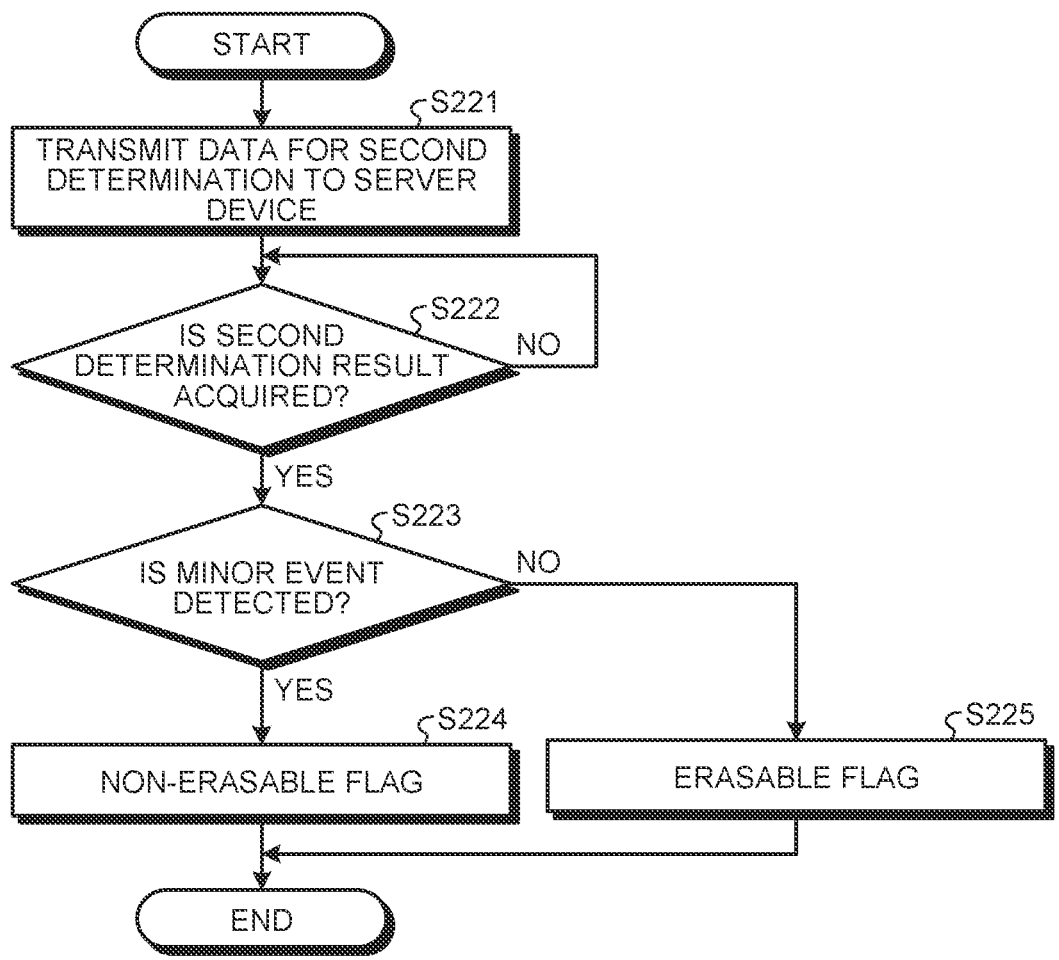
FIG. 15 is a flowchart illustrating the processing procedure in the recording device according to the second embodiment.

A recording system 1A according to the present embodiment is described with reference to FIGS. 13 to 15. FIG. 13 is a schematic diagram illustrating an exemplary configuration of a recording system according to the second embodiment. FIG. 14 is a schematic diagram illustrating an exemplary configuration of a recording device according to the second embodiment. FIG. 15 is a flowchart illustrating the processing procedure in the recording device according to the second embodiment. In the present embodiment, a server device 10A and a recording device 30A differ in configuration from the server device 10 and the recording device 30 of the first embodiment. More specifically, a control unit 20A of the server device 10A differs from the control unit 20 of the first embodiment in that it includes the communication control unit 21, the data acquisition unit 22, the analysis unit 23, the learning unit 24, a first determination unit 25A, the recording control unit 26, and a second determination unit 27A. A control unit 40A of the recording device 30A differs from the control unit 40 of the first embodiment in that it includes the communication control unit 41, the recording data acquisition unit 42, the sensor data acquisition unit 45, the acceleration determination unit 46, a first determination result acquisition unit 47A, the video data processing unit 48, a video recording control unit 49A, the operation control unit 51, and a second determination result acquisition unit 52A. The recording data acquisition unit 42 includes the video data acquisition unit 43 and the audio data acquisition unit 44. In the following description, the same reference numerals or corresponding reference numerals are given to similar components to those of the server device 10 and the recording device 30, and a detailed description thereof will be omitted.

The recording device 30A transmits the recording data or the event recording data to the server device 10A via the communication unit 31 as the recording data for determining whether deletion is allowed. This is performed at every predetermined interval, every time the recording data or the event recording data is recorded in the recording unit 39, or at the desired timing.

The first determination unit 25A has a function similar to that of the determination unit 25.

In the case where the recording data for determining whether the deletion is allowed is acquired from the recording device 30A, the second determination unit 27A uses the DNN to determine the occurrence of the event. More specifically, the second determination unit 27A reads the trained DNN model from the recording unit 12 to reproduce the DNN and determines the occurrence of an event from the recording data for determining whether the deletion is allowed. The determination in the second determination unit 27A can be executed in a manner similar to the determination in the known deep learning. The recording data acquired by the second determination unit 27A is, for example, the event recording data recorded in the recording unit 39 of the recording device 30A.

The first determination result acquisition unit 47A has a function similar to that of the determination result acquisition unit 47.

The second determination result acquisition unit 52A acquires the determination result as to whether an event occurs from the recording data for determining whether the deletion is allowed by the server device 10A.

The video recording control unit 49A adds a non-erasable flag (saving flag) or an erasable flag (erasure flag) as attribute information to the event recording data depending on the determination result of the event recording data and causes the recording unit 39 to record it. More specifically, in the case where the second determination unit 27A determines the occurrence of an event acquired by the second determination result acquisition unit 52A, the video recording control unit 49A attaches the attribute information of the non-erasable flag that restricts erasure to the event recording data. In the case where the second determination unit 27A does not determine the occurrence of an event, the video recording control unit 49A attaches the erasable flag that allows erasure to the event recording data acquired by the second determination result acquisition unit 52A. The event recording data to which the non-erasable flag is attached is restricted from performing the erasing operation during a predetermined period, or is recorded in a region where the erasing operation by the user operation is restricted, or is transferred to an external device, for example. The event recording data to which the erasable flag is attached can be erased by a user operation.

Given below is an explanation of the determination result acquisition process with reference to FIG. 15. The control unit 40A transmits the event recording data to the server device 10A as the data used for the second determination by the second determination result acquisition unit 52A (step S221). The control unit 40A proceeds to step S222.

The control unit 40A determines whether the second determination result acquisition unit 52A acquires the determination result from the server device 10A (step S222). If the control unit 40A determines that the determination result is acquired (Yes in step S222), the processing proceeds to step S223. If it is not determined that the determination result is acquired (No in step S222), the control unit 40A re-executes the process of step S222.

If it is determined that the determination result is acquired (Yes in step S222), the control unit 40A determines whether the determination result indicates that a minor event occurs (step S223). If the control unit 40A determines that the determination result indicates that the minor event occurs (Yes in step S223), the processing proceeds to step S224. If the control unit 40A does not determine that the determination result indicates that the minor event occurs (No in step S223), the processing proceeds to step S225.

In the case where the determination result indicates that a minor event occurs (Yes in step S223), the control unit 40A attaches a non-erasable flag as attribute information to the event recording data transmitted as the data for the second determination (Step S224). The control unit 40A ends the processing.

In the case where the determination result does not indicate that a minor event occurs (No in step S223), the control unit 40A attaches an erasable flag as attribute information to the event recording data transmitted as the data for the second determination (Step S225). The control unit 40A ends the processing.

Thus, also in the case where the recording data for determining whether the deletion is allowed is acquired from the recording device 30A, the server device 10A analyzes it to create the line graph information and uses the DNN to determine the occurrence of an event.

The recording device 30A causes the server device 10A to determine whether an event occurs by using the DNN on the basis of the event recording data. The recording device 30A attaches a non-erasable flag or an erasable flag as attribute information depending on the determination result of the event recording data and causes the recording unit 39 to record it.

As described above, according to the present embodiment, also in the case where the recording data for determining whether the deletion is allowed is acquired from the recording device 30A, the server device 10A can analyze it to create the line graph information and uses the DNN to determine the occurrence of an event.

According to the present embodiment, the recording device 30A can cause the server device 10A to determine whether an event occurs by using the DNN on the basis of the event recording data. According to the present embodiment, the recording device 30A can attach a non-erasable flag or an erasable flag as attribute information depending on the determination result of the event recording data and cause the recording unit 39 to record it. In this way, the present embodiment makes it possible to appropriately determine whether the event recording data is allowed to be deleted. The present embodiment makes it possible to prevent the event recording data captured when the event occurs from being accidentally deleted. The present embodiment makes it possible for, in one example, unnecessary event recording data where an event occurs but being captured upon running on a step to be erasable.

Although the recording system 1 according to the present disclosure is described above, it can be implemented in various different forms other than the above-described embodiments.

Each component of the illustrated recording system 1 is conceptually functional and does not necessarily have to be physically configured as illustrated in the drawings. In other words, the specific form of each device is not limited to the one illustrated in the drawings, and the entirety or a part of the devices is functionally or physically dispersed or integrated in any units depending on the processing load and usage status of each device.

The configuration of the recording system 1 is implemented, for example, by a program loaded in a memory as software. In the above embodiments, the description is given as a functional block implemented by the cooperation of hardware or software. In other words, such functional block can be implemented in various forms by hardware only, software only, or a combination thereof.

According to the present disclosure, it is possible to adequately record an event.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording system comprising:
a processor configured to:
acquire recording data in which a surrounding situation of a vehicle is recorded;
acquire sensor data of an accelerometer that detects an acceleration of the vehicle;
perform image analysis processing on video data included in the recording data to create information regarding a transition of a color component in the video data, the video data being obtained by capturing the surrounding situation of the vehicle;
learn the transition of the color component using artificial intelligence to create a trained model used to determine an occurrence of an event;
determine whether the event occurs using the trained model on a basis of the recording data;
when the sensor data indicates that the acceleration is equal to or higher than a first threshold, determine that the event occurs, and
when the sensor data indicates that the acceleration is less than the first threshold and equal to or higher than a second threshold, determine whether the event occurs using the trained model on a basis of the recording data including data at a time point upon detection of the acceleration; and
in a case where it is determined that the event occurs, record, as event recording data, the recording data including data at the time point upon the occurrence of the event.

2. The recording system according to claim 1, wherein the processor is further configured to
learn a tendency of change in the color component in the recording data upon the occurrence of the event using artificial intelligence on a basis of the recording data upon an occurrence of a previous event.

3. The recording system according to claim 1, wherein the recording data further includes audio data obtained by acquiring sound of surroundings of the vehicle, and wherein the the processor is configured to perform signal processing on the audio data to create information regarding a transition of a frequency component included in the audio data.

4. A recording method comprising:
acquiring recording data in which a surrounding situation of a vehicle is recorded;
acquiring sensor data of an accelerometer that detects an acceleration of the vehicle;
performing image analysis processing on video data included in the recording data to create information regarding a transition of a color component in the video data, the video data being obtained by capturing the surrounding situation of the vehicle;
learning the transition of the color component using artificial intelligence to create a trained model used to determine an occurrence of an event;
performing control to:
when the sensor data indicates that the acceleration is equal to or higher than a first threshold, determine that the event occurs, and
when the sensor data indicates that the acceleration is less than the first threshold and equal to ore higher than a second threshold, determine whether the event occurred using the trained model on a basis of the recording data including data at a time point upon detection of the acceleration; and
causing, in a case where it is determined that the event occurs, record, as event recording data, the recording data including data at a time point upon the occurrence of the event.

5. A recording system comprising:
a processor configured to
acquire recording data in which a surrounding situation of a vehicle is recorded;
acquire sensor data of an accelerometer that detects an acceleration of the vehicle;
analyze video data included in the recording data to create information regarding a transition of a color component in the video data;
determine whether an event occurs on a basis of the information regarding the transition of the color component;
when the sensor data indicates that the acceleration is equal to or higher than a first threshold, determine that the event occurs, and
when the sensor data indicates that the acceleration is less than the first threshold and equal to or higher than a second threshold, determine whether the event occurs on a basis of the recording data including data at a time point upon detection of the acceleration as well as information created by analyzing the video data; and
in a case where it is determined that the event has occurred, record, as event recording data, the recording data including data at a time point upon the occurrence of the event.

* * * * *